United States Patent
Ould-Ahmed-Vall et al.

(10) Patent No.: US 9,207,942 B2
(45) Date of Patent: Dec. 8, 2015

(54) SYSTEMS, APPARATUSES, AND METHODS FOR ZEROING OF BITS IN A DATA ELEMENT

(71) Applicants: Elmoustapha Ould-Ahmed-Vall, Chandler, AZ (US); Robert Valentine, Kiryat Tivon (IL)

(72) Inventors: Elmoustapha Ould-Ahmed-Vall, Chandler, AZ (US); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 13/840,669

(22) Filed: Mar. 15, 2013

(65) Prior Publication Data

US 2014/0281400 A1 Sep. 18, 2014

(51) Int. Cl.
G06F 9/30 (2006.01)
G06F 9/00 (2006.01)

(52) U.S. Cl.
CPC ........ *G06F 9/30149* (2013.01); *G06F 9/30018* (2013.01); *G06F 9/30036* (2013.01)

(58) Field of Classification Search
None
See application file for complete search history.

(56) References Cited

U.S. PATENT DOCUMENTS

2014/0189307 A1* 7/2014 Valentine et al. ............. 712/208

* cited by examiner

*Primary Examiner* — Scott Sun
(74) *Attorney, Agent, or Firm* — Nicholson De Vos Webster & Elliott LLP

(57) ABSTRACT

Embodiments of systems, methods and apparatuses for execution a NAME instruction are described. The execution of a VPBZHI causes, on a per data element basis of a second source, a zeroing of bits higher (more significant) than a starting point in the data element. The starting point is defined by the contents of a data element in a first source. The resultant data elements are stored in a corresponding data element position of a destination.

20 Claims, 15 Drawing Sheets

NUMBER OF ONE BIT VECTOR WRITE MASK ELEMENTS

| DATA ELEMENT SIZE FOR VECTOR | VECTOR SIZE | | |
|---|---|---|---|
| | 128 BITS | 256 BITS | 512 BITS |
| 8-BIT BYTES | 16 | 32 | 64 |
| 16-BIT WORDS | 8 | 16 | 32 |
| 32-BIT DWORDS / SP | 4 | 8 | 16 |
| 64-BIT QWORDS / DP | 2 | 4 | 8 |

| | | | |
|---|---|---|---|
| DESTINATION (original) 301 | 44444444x | 44444444x | FFFFFFFFx | 88888888x |
| SOURCE 1 301 | 00000000x | 0000000Fx | 00000010x | 00000002x |
| SOURCE 2 303 | 76543210x | 33FFx | FFF0FFFFx | 00000010x |
| WRITEMASK 305 | 0 | 1 | 1 | 0 |
| DESTINATION (after) 309 | 44444444x | 00002AFFx | 0000000Fx | 88888888x |

FIGURE 3(A)

| | | | |
|---|---|---|---|
| DESTINATION (original) | 44444444x | 44444444x | FFFFFFFFx | 88888888x |
| SOURCE 1 311 | 00000000x | 0000000Fx | 00000010x | 00000002x |
| SOURCE 2 313 | 76543210x | 33FFx | FFF0FFFFx | 00000010x |
| WRITEMASK 315 | 0 | 1 | 1 | 0 |
| DESTINATION (after) 319 | 0x | 00002AFFx | 0000000Fx | 0x |

FIGURE 3(B)

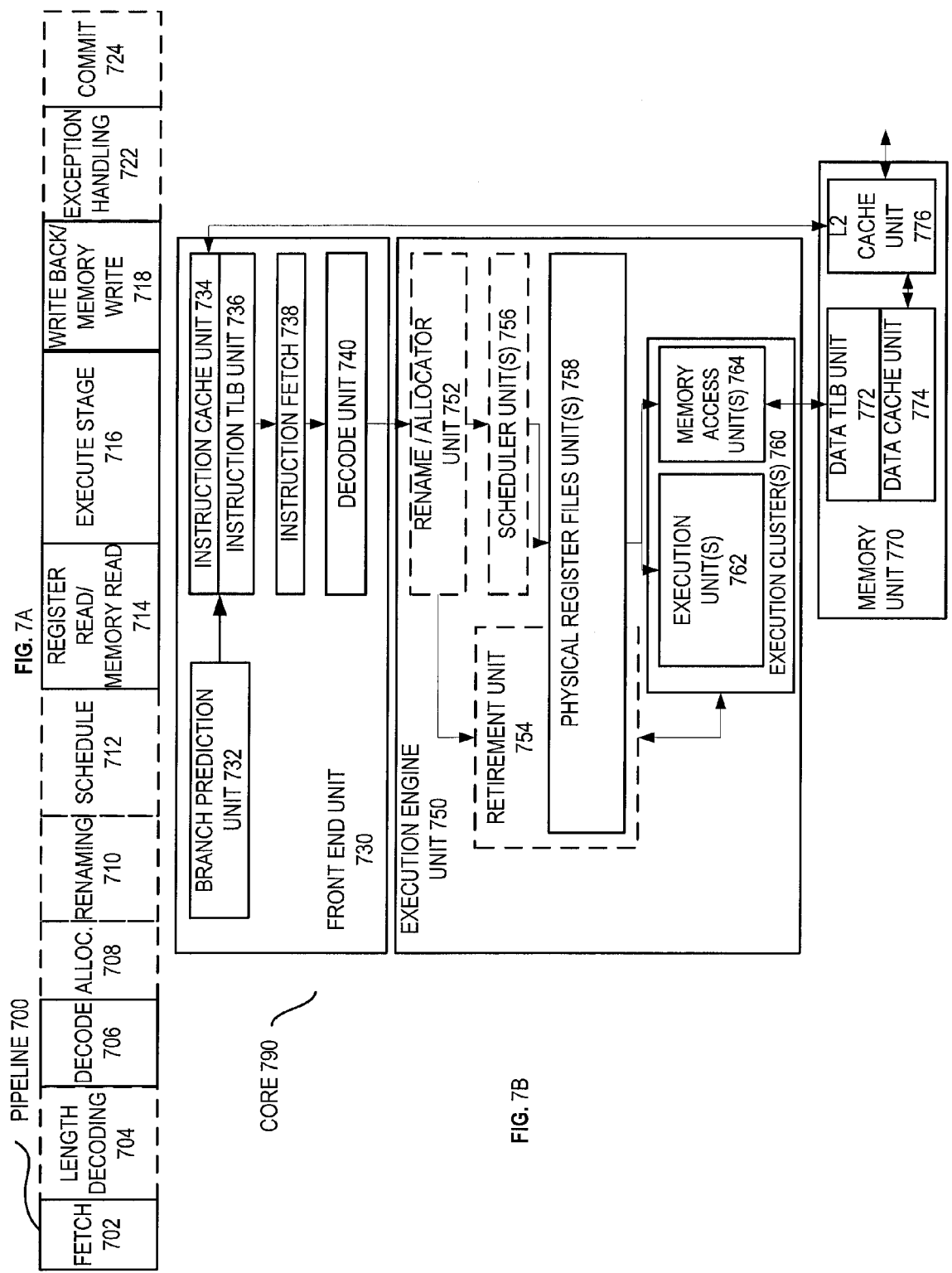

US 9,207,942 B2

SYSTEMS, APPARATUSES, AND METHODS FOR ZEROING OF BITS IN A DATA ELEMENT

FIELD OF INVENTION

The field of invention relates generally to computer processor architecture, and, more specifically, to instructions which when executed cause a particular result.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). It should be noted that the term instruction generally refers herein to a macro-instruction—that is instructions that are provided to the processor for execution—as opposed to micro-instructions or micro-ops—that result from a processor's decoder decoding macro-instructions).

BRIEF DESCRIPTION OF THE DRAWINGS

The present invention is illustrated by way of example and not limitation in the figures of the accompanying drawings, in which like references indicate similar elements and in which:

FIGS. 3A-B illustrates an exemplary illustration of an operation of VPBZHI.

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to embodiments of the invention.

DETAILED DESCRIPTION

Figure 1:
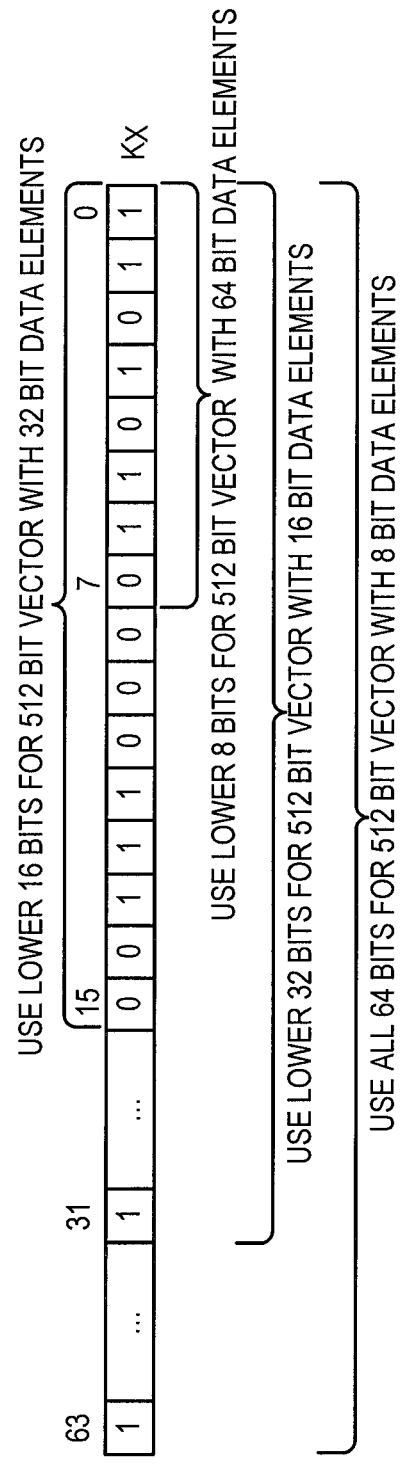
FIG. 1 illustrates a correlation between the number of one active bit vector writemask elements and the vector size and the data element size according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

The instruction set architecture is distinguished from the microarchitecture, which is the internal design of the processor implementing the ISA. Processors with different microarchitectures can share a common instruction set. For example, Intel Pentium 4 processors, Intel Core processors, and Advanced Micro Devices, Inc. of Sunnyvale Calif. processors implement nearly identical versions of the x86 instruction set (with some extensions having been added to newer versions), but have different internal designs. For example, the same register architecture of the ISA may be implemented in different ways in different micro-architectures using well known techniques, including dedicated physical registers, one or more dynamically allocated physical registers using a register renaming mechanism (e.g., the use of a Register Alias Table (RAT), a Reorder Buffer (ROB) and a retirement register file as described in U.S. Pat. No. 5,446,912; the use of multiple maps and a pool of registers as described in U.S. Pat. No. 5,207,132), etc. Unless otherwise specified, the phrases register architecture, register file, and register refer to that which is visible to the software/programmer and the manner in which instructions specify registers. Where specificity is desired, the adjective logical, architectural, or software visible will be used to indicate registers/files in the register architecture, while different adjectives will be used to designate registers in a given micro-architecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. A given instruction is expressed using a given instruction format and specifies the operation and the operands. An instruction stream is a specific sequence of instructions, where each instruction in the sequence is an occurrence of an instruction in an instruction format.

Scientific, financial, auto-vectorized general purpose, RMS (recognition, mining, and synthesis)/visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform the same operation on multiple data items. SIMD technology is especially suited to processors that can logically divide the bits in a register into a number of fixed-sized data elements, each of which represents a separate value. For example, the bits in a 64-bit register may be specified as a source operand to be operated on as four separate 16-bit data elements, each of which represents a separate 16-bit value. As another example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as the packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that have only one or has more than two source vector operands; that operate in a horizontal fashion; that generate a result vector operand that is of a different size, that have a different size of data elements, and/or that have a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction).

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance (Core™ and MMX™ are registered trademarks or trademarks of Intel Corporation of Santa Clara, Calif.). An additional set of SIMD extensions, referred to the Advanced Vector Extensions (AVX) (AVX1 and AVX2) and using the VEX coding scheme, has been released and/or published (e.g., see Intel® 64 and IA-32 Architectures Software Developers Manual, October 2011; and see Intel® Advanced Vector Extensions Programming Reference, June 2011).

In the description below, there are some items that may need explanation prior to describing the operations of this particular instruction in the instruction set architecture. One such item is called a "writemask register" which is generally used to predicate an operand to conditionally control per-element computational operation (below, the term mask register may also be used and it refers to a writemask register such as the "k" registers discussed below). As used below, a writemask register stores a plurality of bits (16, 32, 64, etc.) wherein each active bit of the writemask register governs the operation/update of a packed data element of a vector register during SIMD processing. Typically, there is more than one writemask register available for use by a processor core.

The instruction set architecture includes at least some SIMD instructions that specify vector operations and that have fields to select source registers and/or destination registers from these vector registers (an exemplary SIMD instruction may specify a vector operation to be performed on the contents of one or more of the vector registers, and the result of that vector operation to be stored in one of the vector registers). Different embodiments of the invention may have different sized vector registers and support more/less/different sized data elements.

The size of the multi-bit data elements specified by a SIMD instruction (e.g., byte, word, double word, quad word) determines the bit locations of the "data element positions" within a vector register, and the size of the vector operand determines the number of data elements. A packed data element refers to the data stored in a particular position. In other words, depending on the size of the data elements in the destination operand and the size of the destination operand (the total number of bits in the destination operand) (or put another way, depending on the size of the destination operand and the number of data elements within the destination operand), the bit locations of the multi-bit data element positions within the resulting vector operand change (e.g., if the destination for the resulting vector operand is a vector register (in this discussion vector registers and packed data element registers are used interchangeably), then the bit locations of the multi-bit data element positions within the destination vector register change). For example, the bit locations of the multi-bit data elements are different between a vector operation that operates on 32-bit data elements (data element position 0 occupies bit locations 31:0, data element position 1 occupies bit locations 63:32, and so on) and a vector operation that operates on 64-bit data elements (data element position 0 occupies bit locations 63:0, data element position 1 occupies bit locations 127:64, and so on).

Additionally, there is a correlation between the number of one active bit vector writemask elements and the vector size and the data element size according to one embodiment of the invention as shown in FIG. 1. Vector sizes of 128-bits, 256-bits, and 512-bits are shown, although other widths are also possible. Data element sizes of 8-bit bytes (B), 16-bit words (W), 32-bit doublewords (D) or single precision floating point, and 64-bit quadwords (Q) or double precision floating point are considered, although other widths are also possible. As shown, when the vector size is 128-bits, 16-bits may be used for masking when the vector's data element size is 8-bits, 8-bits may be used for masking when the vector's data element size is 16-bits, 4-bits may be used for masking when the vector's data element size is 32-bits, and 2-bits may be used for masking when the vector's data element size is 64-bits. When the vector size is 256-bits, 32-bits may be used for masking when the packed data element width is 8-bits, 16-bits may be used for masking when the vector's data element size is 16-bits, 8-bits may be used for masking when the vector's data element size is 32-bits, and 4-bits may be used for masking when the vector's data element size is 64-bits. When the vector size is 512-bits, 64-bits may be used for masking when the vector's data element size is 8-bits, 32-bits may be used for masking when the vector's data element size is 16-bits, 16-bits may be used for masking when the vector's data element size is 32-bits, and 8-bits may be used for masking when the vector's data element size is 64-bits.

Depending upon the combination of the vector size and the data element size, either all 64-bits, or only a subset of the 64-bits, may be used as a write mask. Generally, when a single, per-element masking control bit is used, the number of bits in the vector writemask register used for masking (active bits) is equal to the vector size in bits divided by the vector's data element size in bits.

As noted above, writemask registers contain mask bits that correspond to elements in a vector register (or memory location) and track the elements upon which operations should be performed. For this reason, it is desirable to have common operations which replicate similar behavior on these mask bits as for the vector registers and in general allow one to adjust these mask bits within the writemask registers.

Described below are embodiments of an instruction that uses a control vector to zero out bits starting at a specific position in each data element of the source. This instruction may be used to efficiently vectorize many bit manipulation tasks including extracting bits within data elements of a vector register and inserting bits into each data element. Below are embodiments of an instruction generically called a vector packed zero high bits starting with a specified bit position ("VPBZHI") instruction of the instruction set and embodiments of systems, architectures, instruction formats, etc. that may be used to execute such an instruction. The execution of a VPBZHI causes, on a per data element basis of a second source, a zeroing of bits higher (more significant) than a starting point in the data element. The starting point is defined by the contents of a data element in a first source. The resultant data elements are stored in a corresponding data element position of a destination.

Figure 2:
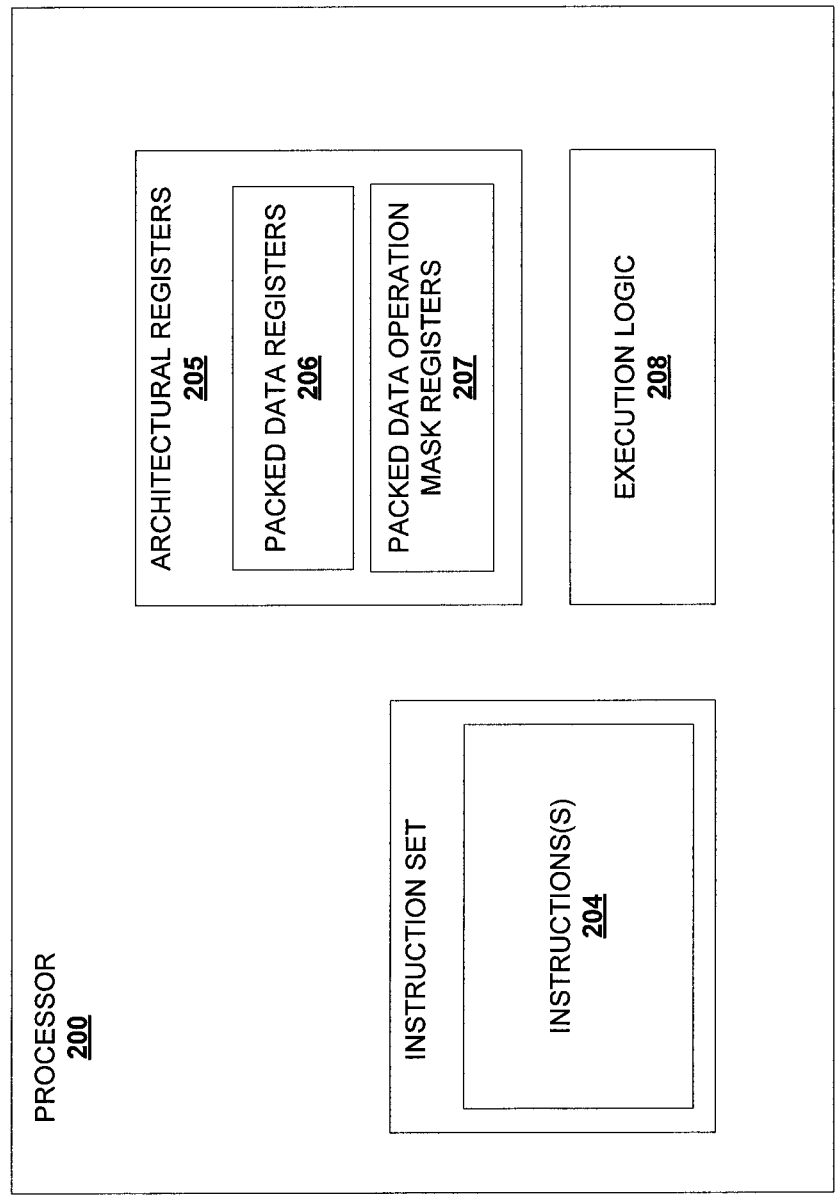
FIG. 2 is a block diagram of an exemplary embodiment of a processor (processor core) to execute one or more instructions.

FIG. 2 is a block diagram of an exemplary embodiment of a processor (processor core) 200 to execute one or more VPBZHI instructions 204. In some embodiments, the processor may be a general-purpose processor (e.g., of the type used in desktop, laptop, servers, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers, to name just a few examples. The processor may be any of various complex instruction set computing (CISC) processors, various reduced instruction set computing (RISC) processors, various very long instruction word (VLIW) processors, various hybrids thereof, or other types of processors entirely.

The processor 200 includes architecturally-visible registers (e.g., an architectural register file) 205. The architectural registers may also be referred to herein simply as registers. Unless otherwise specified or apparent, the phrases architectural register, register file, and register are used herein to refer to registers that are visible to the software and/or programmer and/or the registers that are specified by macroinstructions or assembly language instructions to identify operands. These registers are contrasted to other non-architectural or non-architecturally visible registers in a given microarchitecture (e.g., temporary registers used by instructions, reorder buffers, retirement registers, etc.). The registers generally represent on-die processor storage locations. The illustrated architectural registers include packed data registers 206. Each of the packed data registers may be operable to store packed or vector data. The illustrated architectural registers also include packed data operation mask registers 207. Each of the packed data operation mask registers may be operable to store a packed data operation mask. These registers may be referred to as writemask registers in this description. Packed data operands may be stored in the packed data registers 207.

The processor also includes execution logic 208. The execution logic is operable to execute or process the one or more VPBZHI instructions 204. In some embodiments, the execution logic may include particular logic (e.g., particular circuitry or hardware potentially combined with firmware) to execute these instructions.

FIGS. 3A-B illustrate an exemplary illustration of an operation of VPBZHI. In the illustrated example 3(A), data elements from a first source register 301 provide, on a per data element basis, the starting point for zeroing of bits in a corresponding data element in the second source register/memory location 303. In this example, both the first and second sources 301, 303 have four data elements in positions 0-3 (the least significant on the right). In data element position 0, the first source 301 has a value of 00000002 in hexadecimal format. This is 2 in decimal notation and indicates that bit position 2 of the second source 303 is the point at which a zeroing may begin. However, writemasking is used in this illustration and no zeroing of bits in the second source is to occur, because of the value of the writemask 305 at this bit position, and be saved in the corresponding destination 309. In this example, the contents of the destination 309 are the same as prior to the instruction being executed.

In data element position 1, the first source 301 has a value of 00000010 in hexadecimal format. This is 16 in decimal notation and indicates that bit position 16 of the second source 303 is the point at which a zeroing may begin. Again, writemasking is used in this illustration, but this time, the value in this bit position of the writemask 305 indicates that zeroing and writing is to occur. As such, the data of the second source 303 will be zeroed out beginning at bit position 16 and that new value will be stored in data element position 1 of the destination 309.

In the illustrated example 3(B), data elements from a first source register 311 provide, on a per data element basis, the starting point for zeroing of bits in a corresponding data element in the second source register/memory location 313. In this example, both the first and second sources 311, 313 have four data elements in positions 0-3 (the least significant on the right). In data element position 0, the first source 311 has a value of 00000002 in hexadecimal format. This is 2 in decimal notation and indicates that bit position 2 of the second source 313 is the point at which a zeroing may begin. However, writemasking is used in this illustration and no zeroing of bits in the second source is to occur, because of the value of the writemask 315 at this bit position, and be saved in the corresponding destination 319. In this example, the contents of the destination 319 are the zeroed out completely.

In data element position 1, the first source 311 has a value of 00000010 in hexadecimal format. This is 16 in decimal notation and indicates that bit position 16 of the second source 313 is the point at which a zeroing may begin. Again, writemasking is used in this illustration, but this time, the value in this bit position of the writemask 315 indicates that zeroing and writing is to occur. As such, the data of the second source 313 will be zeroed out beginning at bit position 16 and that new value will be stored in data element position 1 of the destination 319.

Exemplary Format of VPBZHI

An exemplary format of this instruction is "VPBZHI {K1} R1, R2/MEM, R3" where the destination operand K1 is an optional writemask register, R1 is a packed data source register (such as a 128-, 256-, 512-bit register, etc.), R2 is a packed data destination register (such as a 128-, 256-, 512-bit register, etc.) or memory location, and R3 is a destination register (such as a 128-, 256-, 512-bit register, etc.), and VPBZHI is the instruction's opcode. The opcode may also designate the size of the data element of the source. For example, VPBZHID indicates that the data elements are 32-bit, VPBZHIB is 8-bit, etc. The size of the data elements and source operands will also determine the number of active bits in the writemask register.

Exemplary Methods of Execution of VPBZHI

Figure 4:
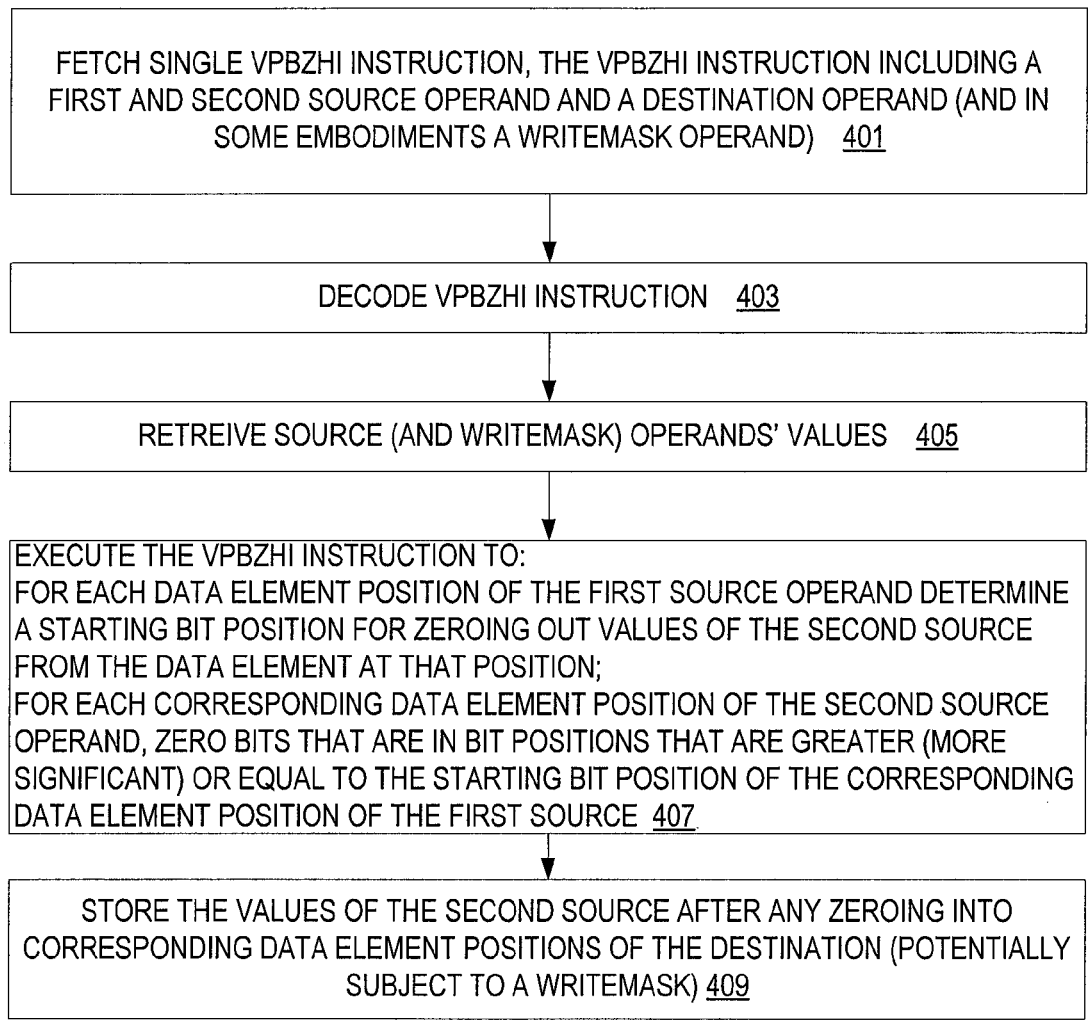
FIG. 4 illustrates an embodiment of the execution of a VPBZHI instruction in a processor.

FIG. 4 illustrates an embodiment of the execution of a VPBZHI instruction in a processor. A VPBZHI instruction with a first and second source operand, a destination operand, an optional writemask operand, and an opcode is fetched at 401.

The VPBZHI instruction is decoded by decoding logic at 403. Depending on the instruction's format, a variety of data may be interpreted at this stage such as if there is to be a data transformation, which registers to write to and/or retrieve, what memory address to access, etc.

The source operands' values are retrieved/read at 405. For example, a source vector register is read. If the source operand is a memory operand, then the data elements associated with that operand is retrieved. In some embodiments, data elements from memory are stored into a temporary register.

The VPBZHI instruction (or operations comprising such an instruction such as microoperations) is executed by execution resources such as one or more functional units at 407 to, for each data element position of the first source operand, determine a starting bit position for zeroing out values of the second source operand beginning at the data element at that bit position. The execution of the instruction also causes, for each corresponding data element position of the second source operand, a zeroing of bits that are in bit positions that are greater (more significant) or equal to the starting bit position found in the corresponding data element position in the first source. Examples of this are found in FIG. 3. In some embodiments, each data element position is evaluated in parallel. In other embodiments, the data element positions are evaluated serially.

The data elements of the second source that have been modified are written to corresponding data element positions of the destination at 409. In some embodiments, when the writemask is used, the corresponding data element positions may not be written to depending on the value of the writemask at that bit position. In some embodiments, when the writemask indicates that the data element position should not be written to, that data element position of the destination is set to all 0s. In other embodiments, when the writemask indicates that the data element position should not be written to, that data element position of the destination is unaltered. While 407 and 409 have been illustrated separately, in some embodiments they are performed together as a part of the execution of the instruction.

In some embodiments, the data of the second source is stored in the destination register prior to any modification of the data elements. For example, if no writemasking is used, all of the data elements from the second source would be stored into the destination and then modified. If writemasking is used, only selected data elements would be moved according to the writemask.

In some embodiments, a temporary storage location is used for modifications such that the data of the second source register is not destroyed when zeroing operations are performed on it.

Figure 5:
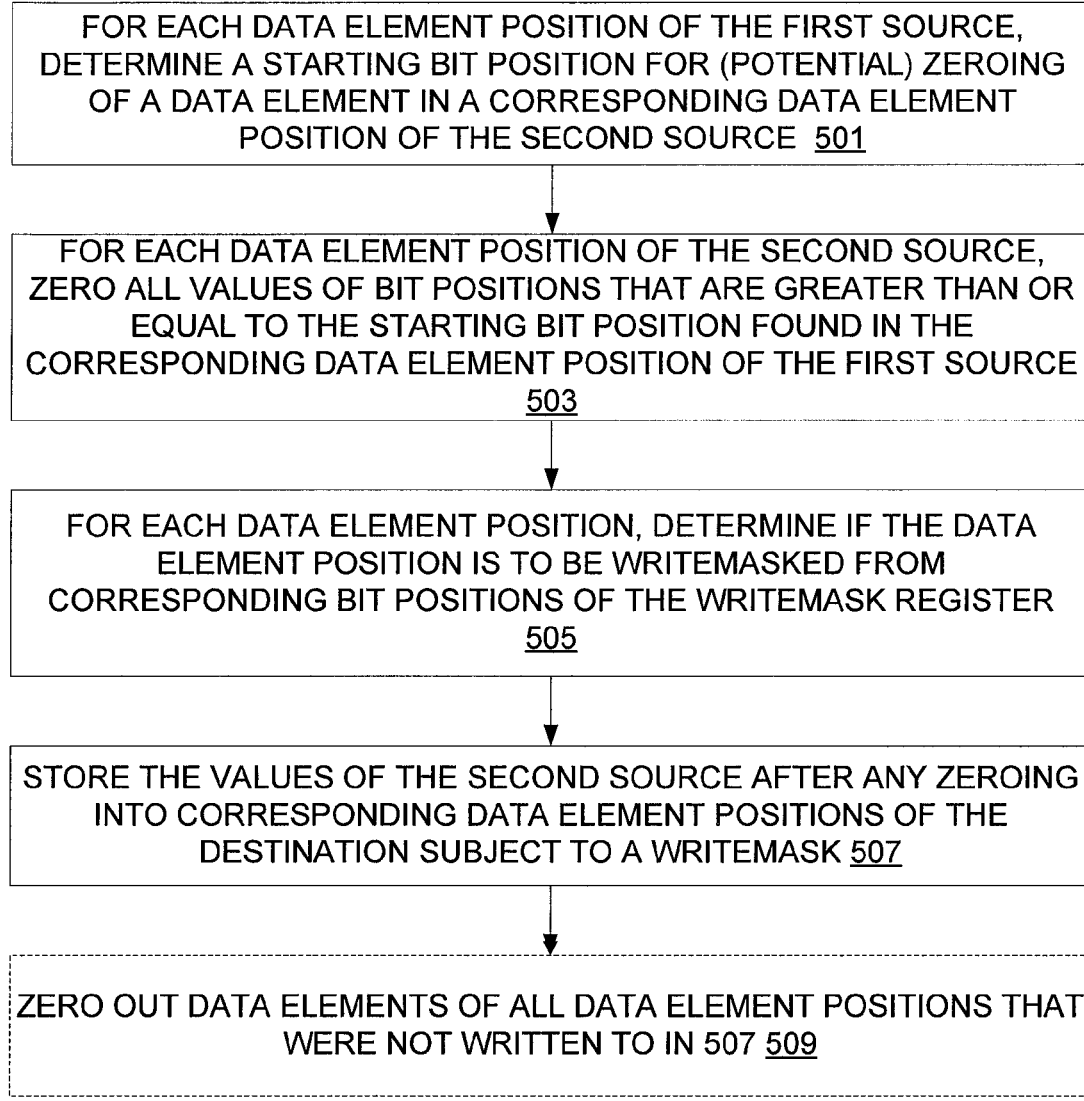
FIG. 5 illustrates an embodiment of a method for processing a VPBZHI instruction.

FIG. 5 illustrates an embodiment of a method for processing a VPBZHI instruction. In this embodiment it is assumed that some, if not all, of the operations 401-405 have been performed earlier, however, they are not shown in order to not obscure the details presented below. For example, the fetching and decoding are not shown, nor is the operand retrieval shown. In this example, each data element position is processed in parallel, however, data element positions may be evaluated serially as well.

At 501, for each data element position of the first source, a determination of a starting bit position for (potentially) zeroing of a data element in a corresponding data element position of the second source is made. For example, in FIG. 3, at data element position 0 this value was 2, and in data element position 1 it was 16. As such, the starting bit positions for potential zeroing are 2 and 16 for the data elements of the corresponding data element positions of the second source. Potentially is used in this discussion as while zeroing may occur, it is possible, depending on the writemask usage, that the changed data element will not be stored in the destination register.

For each data element position of the second source, all bit positions at and above the starting bit position of a data element in a corresponding data element position of the second source are zeroed out at 503. For example, in FIG. 3, at data element position 0 this value the zeroing begins at bit 2 and continues to through the most significant bit of that data element.

For each data element position, a determination of if the data element position is to be writemasked is made at 505. For example, in FIG. 3, at data bit position 0 this value indicates that there will be no write.

The values of the second source that have are not subject to being blocked by the writemask are stored in the destination at corresponding positions at 507.

In some embodiments, the data elements of all data element positions of the destination that were not written to are zeroed out at 509.

While the above as been described as starting with the determined starting bit position and going up, other variants are contemplated. For example, in some embodiments, the operation begins at the starting bit position and goes down. In other embodiments, the starting bit position is not zeroed, but the next in line is.

In some embodiments, the data of the second source is stored in the destination register prior to any modification of the data elements of 503. For example, if no writemasking is used, all of the data elements from the second source would be stored into the destination and then modified. If writemasking is used, only selected data elements would be moved according to the writemask.

In some embodiments, a temporary storage location is used for modifications such that the data of the second source register is not destroyed when zeroing operations are performed on it.

Exemplary Register Architecture

Figure 6:
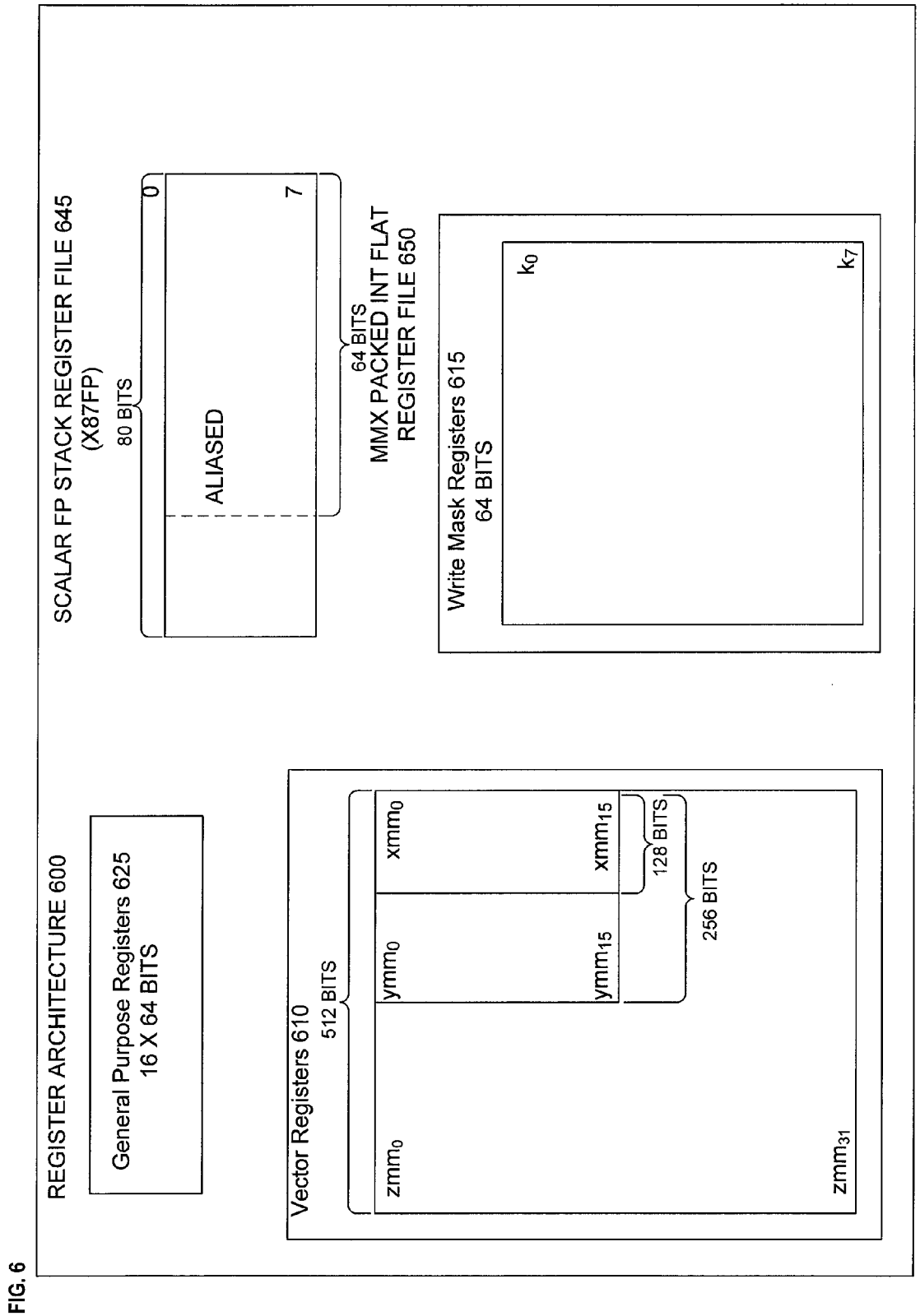
FIG. 6 is a block diagram of a register architecture 600 according to one embodiment of the invention.

FIG. 6 is a block diagram of a register architecture 600 according to one embodiment of the invention. In the embodiment illustrated, there are 32 vector registers 610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

General-purpose registers 625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 645, on which is aliased the MMX packed integer flat register file 650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
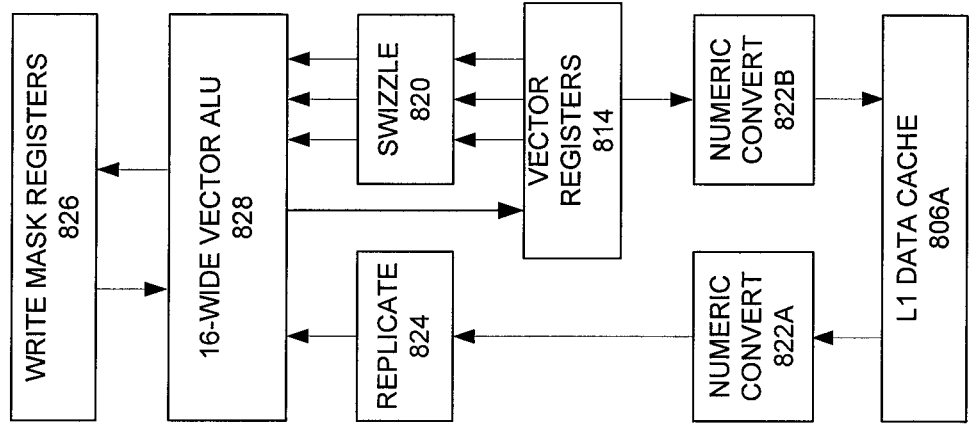
FIGS. 8A-B illustrate a block diagram of a more specific exemplary in-order core architecture, which core would be one of several logic blocks (including other cores of the same type and/or different types) in a chip.
Figure 8A:
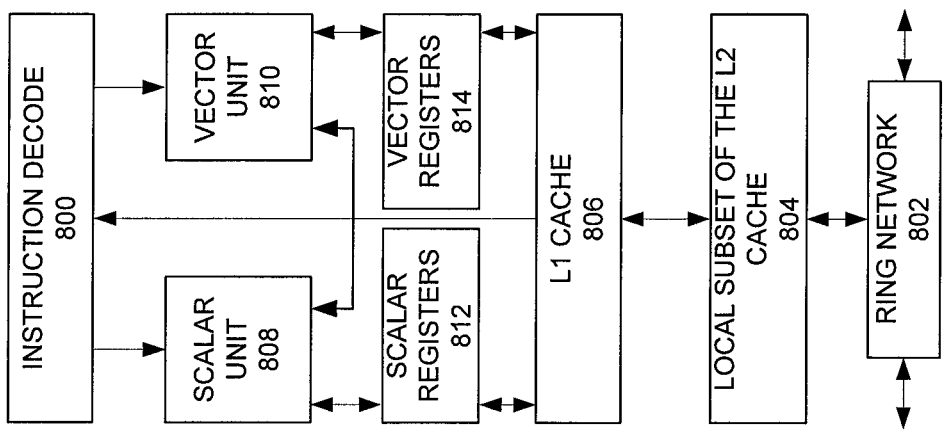

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input.

Processor with Integrated Memory Controller and Graphics

Figure 9:
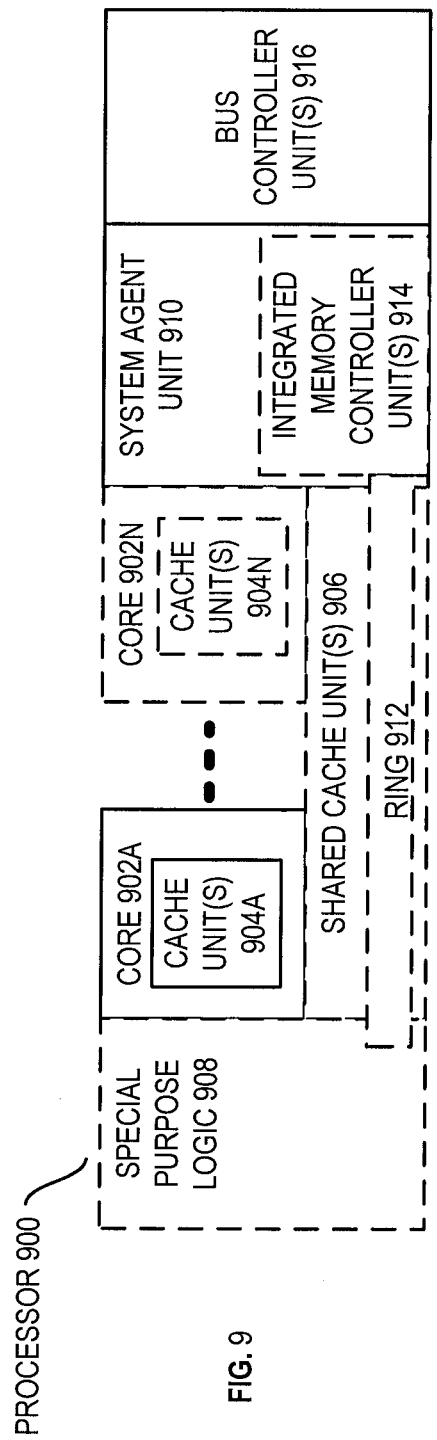
FIG. 9 is a block diagram of a processor 900 that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
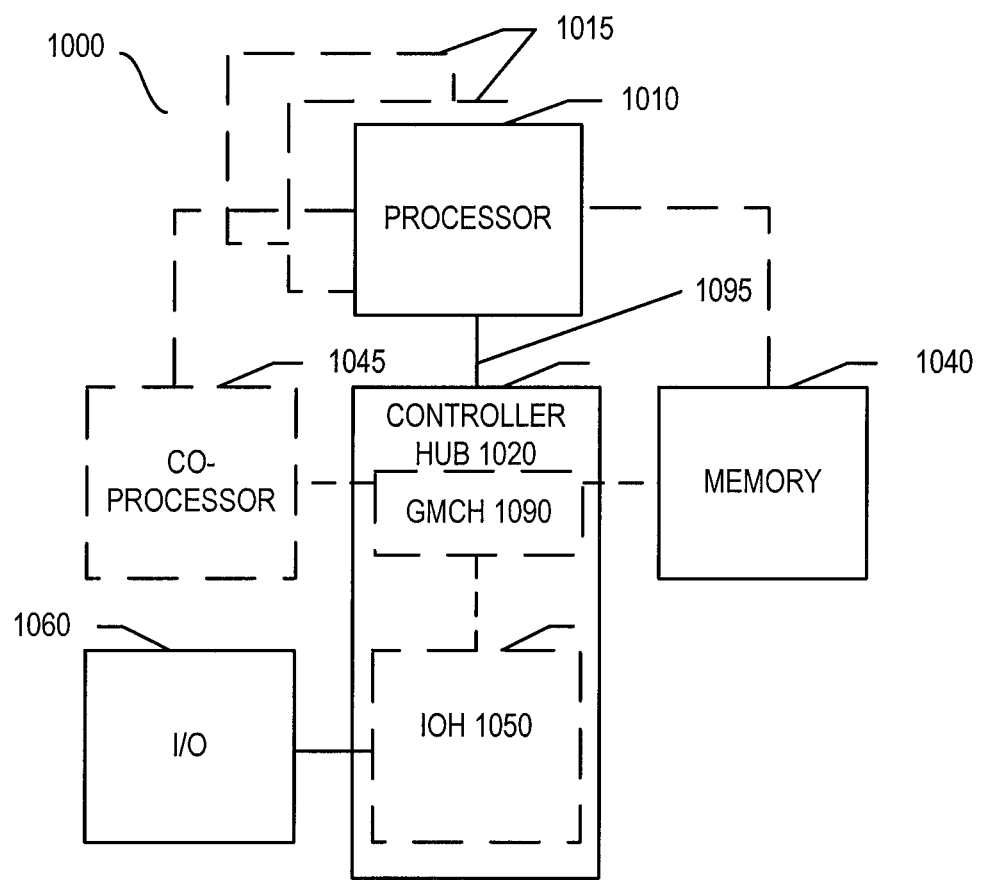
FIGS. 10-13 are block diagrams of exemplary computer architectures.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
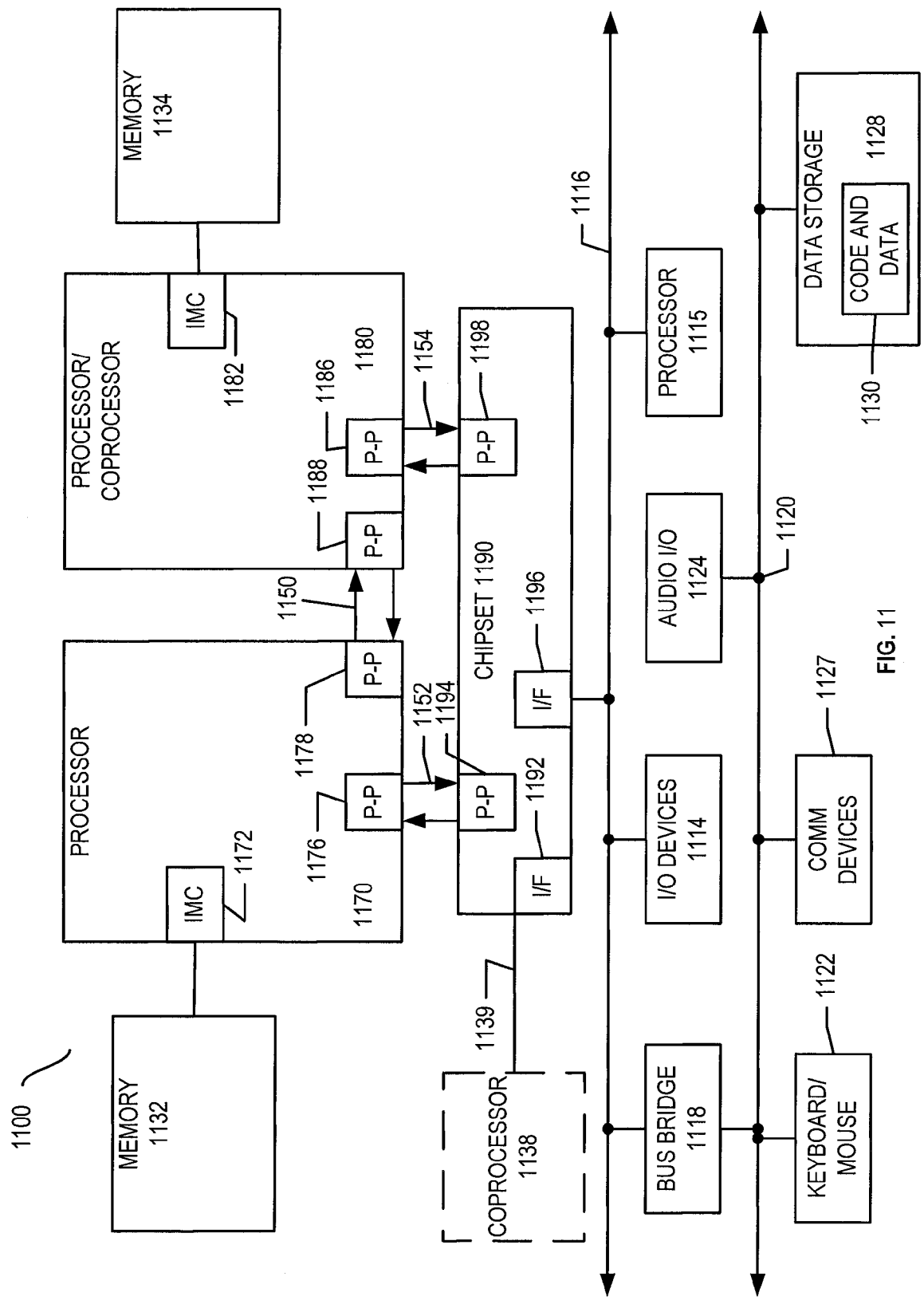

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect

1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
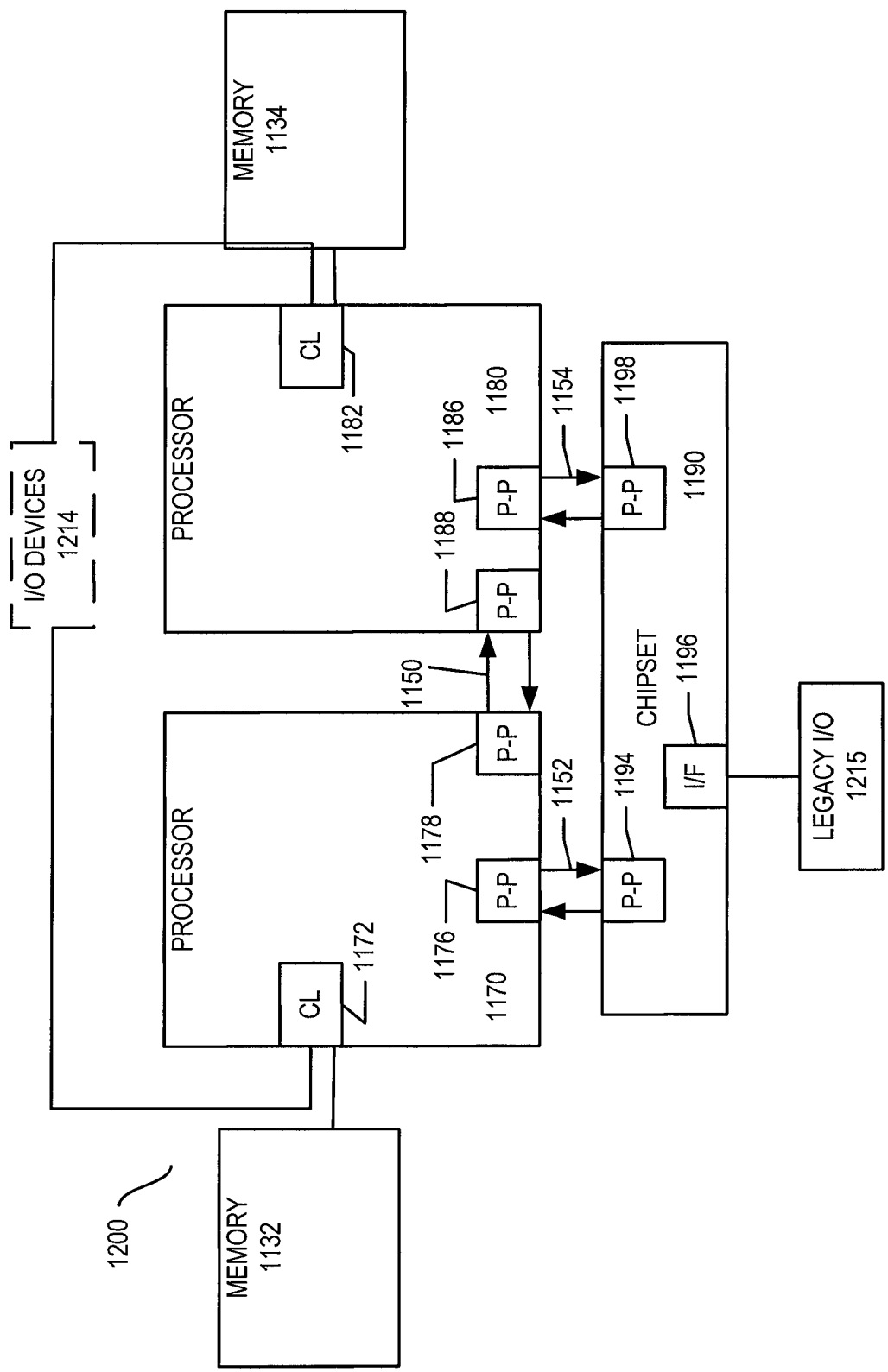

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
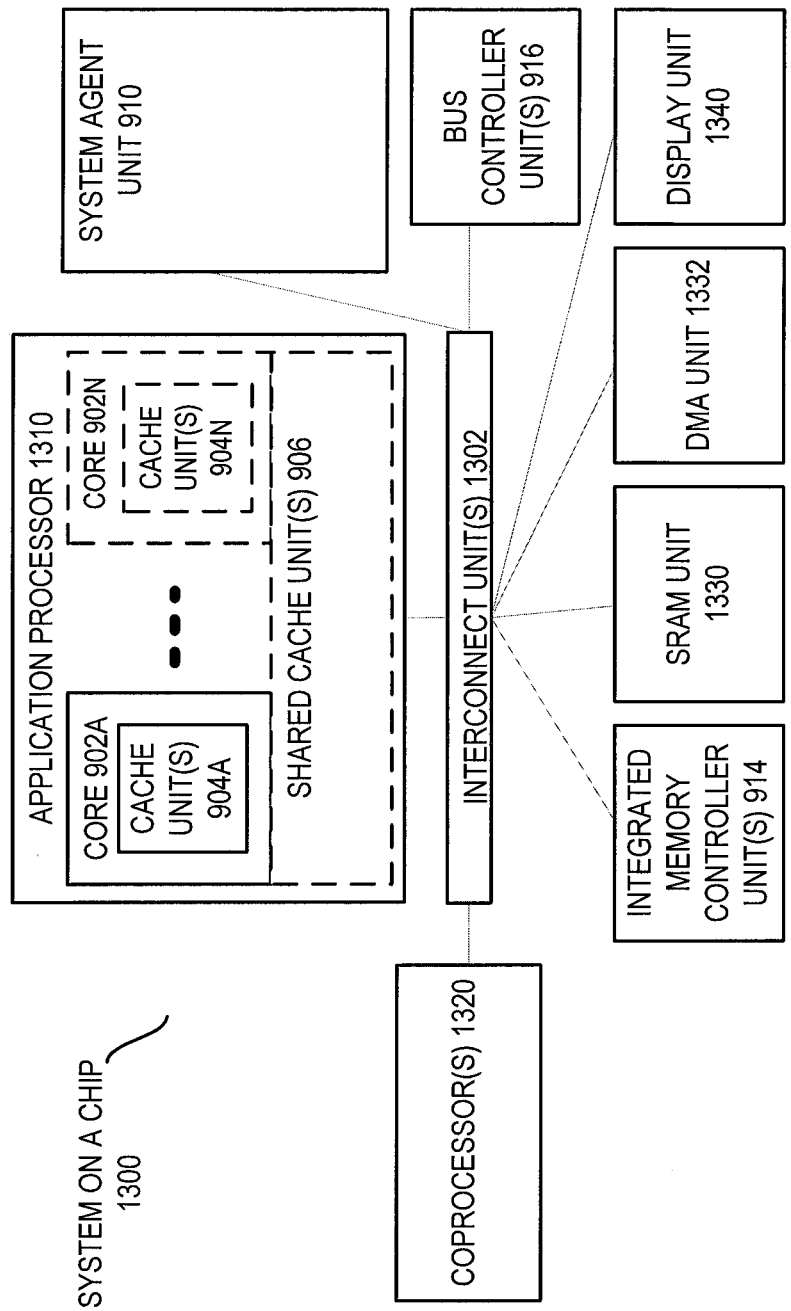

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
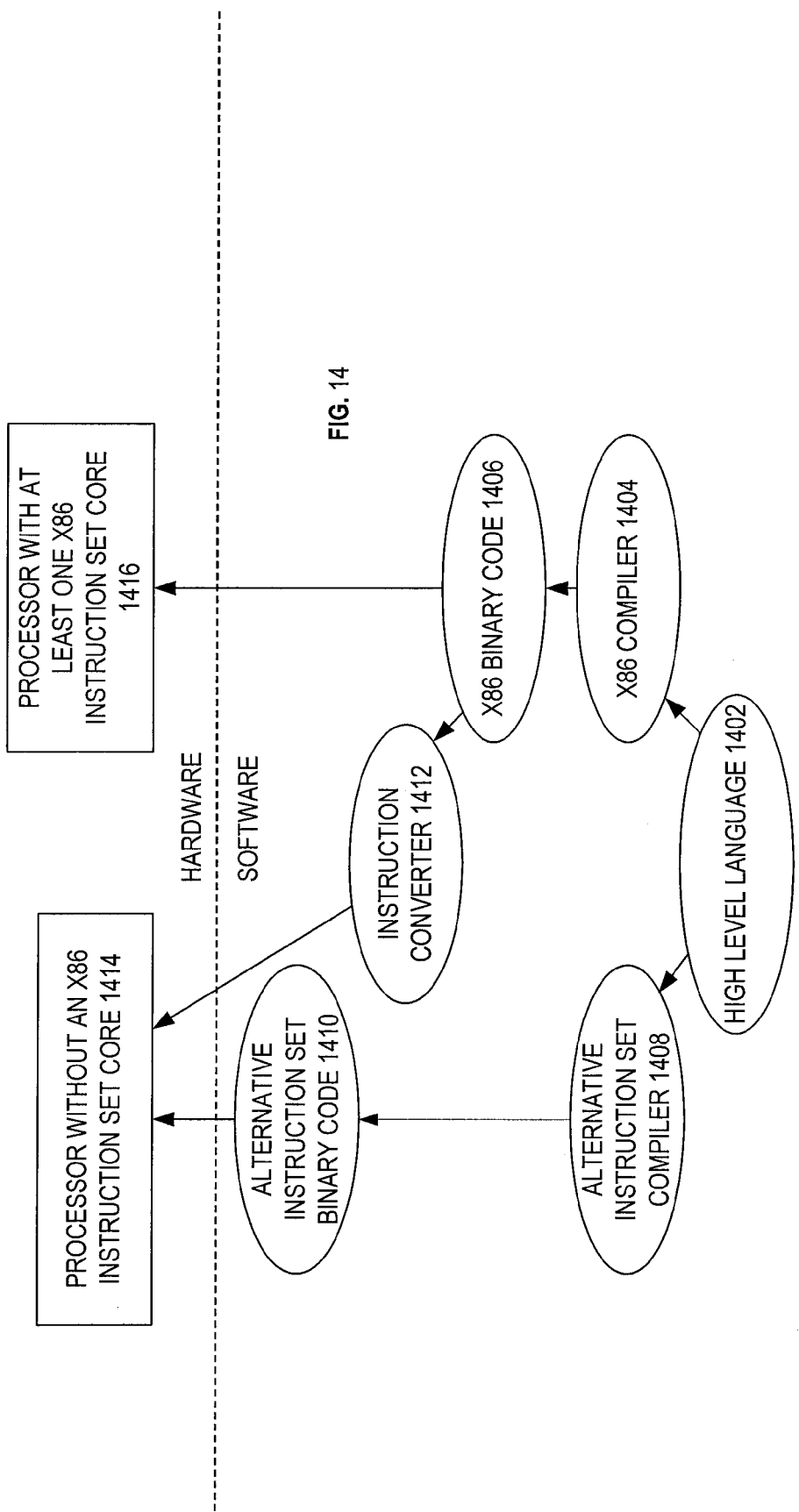
FIG. 14 is a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

What is claimed is:

1. An apparatus comprising:
    decode logic to decode a vector packed zero high bits starting with a specified bit position (VPBZHI) instruction, the VPBZHI instruction including a first and second source operand and a destination operand;
    execution logic to execute the decoded VPBZHI instruction to cause,
        for each data element position of the first source operand a determination of a starting bit position for zeroing out values of the second source beginning at a data element at that starting position,
        for each corresponding data element position of the second source operand, a zeroing of bits that are in bit positions that are more significant or equal to the starting bit position of a corresponding data element position of the first source operand,
        storing into the destination operand values of the second source after any zeroing into corresponding data element positions.

2. The apparatus of claim 1, wherein the source and destination operands are packed data registers.

3. The apparatus of claim 2, wherein the packed data registers of size 128-bit, 256-bit, or 512-bit.

4. The apparatus of claim 1, wherein the instruction further includes a writemask operand.

5. The apparatus of claim 4, wherein the storage in the destination register is subject to the writemask operand's values.

6. The apparatus of claim 4, wherein a number of active bits in the writemask operand is equal to a number of data elements in the source operands.

7. The apparatus of claim 1, wherein the first source and destination operands are packed data registers and the second source operand is a memory location.

8. A method of performing in a computer processor a vector packed zero high bits starting with a specified bit position (VPBZHI) instruction, the VPBZHI instruction including a first and second source operand and a destination operand, the method comprising:
    for each data element position of the first source operand, determining a starting bit position for zeroing out values of the second source beginning at a data element at that starting position,
    for each corresponding data element position of the second source operand, zeroing bits that are in bit positions that are more significant or equal to the starting bit position of a corresponding data element position of the first source operand,
    storing into the destination operand values of the second source after any zeroing into corresponding data element positions.

9. The method of claim 8, wherein the source and destination operands are packed data registers.

10. The method of claim 9, wherein the packed data registers of size 128-bit, 256-bit, or 512-bit.

11. The method of claim 8, wherein the instruction further includes a writemask operand.

12. The method of claim 11, wherein the storage in the destination register is subject to the writemask operand's values.

13. The method of claim 11, wherein a number of active bits in the writemask operand is equal to a number of data elements in the source operands.

14. The method of claim 8, wherein the first source and destination operands are packed data registers and the second source operand is a memory location.

15. A tangible machine-readable medium including code which when executed by a processor causes the processor to execute a method to perform a vector packed zero high bits starting with a specified bit position (VPBZHI) instruction, the VPBZHI instruction including a first and second source operand and a destination operand, the method comprising:
  for each data element position of the first source operand, determining a starting bit position for zeroing out values of the second source beginning at a data element at that starting position,
  for each corresponding data element position of the second source operand, zeroing bits that are in bit positions that are more significant or equal to the starting bit position of a corresponding data element position of the first source operand,
  storing into the destination operand values of the second source after any zeroing into corresponding data element positions.

16. The method of claim 15, wherein the source and destination operands are packed data registers.

17. The method of claim 16, wherein the packed data registers of size 128-bit, 256-bit, or 512-bit.

18. The method of claim 17, wherein the instruction further includes a writemask operand.

19. The method of claim 18, wherein the storage in the destination register is subject to the writemask operand's values.

20. The method of claim 15, wherein the first source and destination operands are packed data registers and the second source operand is a memory location.

\* \* \* \* \*